United States Patent
Muramatsu et al.

(10) Patent No.: US 8,524,122 B2
(45) Date of Patent: Sep. 3, 2013

(54) METHOD OF PRODUCING ITO PARTICLES

(75) Inventors: Atsushi Muramatsu, Miyagi (JP); Kiyoshi Kanie, Miyagi (JP); Kazuhisa Saito, Tokyo (JP); Koji Tanoue, Tokyo (JP); Akira Nagatomi, Tokyo (JP)

(73) Assignees: Tohoku University, Sendai-Shi (JP); Dowa Electronics Materials Co., Ltd., Tokyo (JP)

( * ) Notice: Subject to any disclaimer, the term of this patent is extended or adjusted under 35 U.S.C. 154(b) by 0 days.

(21) Appl. No.: 13/002,995

(22) PCT Filed: Jun. 30, 2009

(86) PCT No.: PCT/JP2009/061946
§ 371 (c)(1),
(2), (4) Date: Apr. 1, 2011

(87) PCT Pub. No.: WO2010/004912
PCT Pub. Date: Jan. 14, 2010

(65) Prior Publication Data
US 2011/0175041 A1    Jul. 21, 2011

(30) Foreign Application Priority Data

Jul. 10, 2008 (JP) ................................ 2008-179992
May 12, 2009 (JP) ................................ 2009-115212
Jun. 23, 2009 (JP) ................................ 2009-148310

(51) Int. Cl.
*H01B 1/02* (2006.01)
(52) U.S. Cl.
USPC ............ 252/519.1; 252/520.1; 106/287.19; 264/614; 264/621; 428/697
(58) Field of Classification Search
USPC ...... 252/519.1, 520.1; 106/287.19; 264/614, 264/621; 428/697
See application file for complete search history.

(56) References Cited

U.S. PATENT DOCUMENTS 6,533,966 B1 * 3/2003 Nonninger et al. ........ 252/520.1
6,936,100 B2 * 8/2005 Tadakuma ...................... 117/68
8,221,535 B2 * 7/2012 Hagiwara et al. ........ 106/287.19

FOREIGN PATENT DOCUMENTS

| JP | A-3-54114 | 3/1991 |
| JP | A-6-232586 | 8/1994 |
| JP | A-2004-123418 | 4/2004 |
| JP | A-2006-96636 | 4/2006 |
| JP | A-2007-269617 | 10/2007 |
| JP | A-2008-222467 | 9/2008 |
| JP | A-2009-7235 | 1/2009 |

OTHER PUBLICATIONS

International Search Report issued in International Application No. PCT/JP2009/061946 on Sep. 29, 2009 (with translation).

* cited by examiner

*Primary Examiner* — Khanh Tuan Nguyen
(74) *Attorney, Agent, or Firm* — Oliff & Berridge, PLC

(57) ABSTRACT

A production method capable of producing ITO particles without using a solvent with a high boiling point as a solvent used in the producing step by a simple treatment method without through a heating process in an atmosphere which disadvantageously causes sintering among the ITO particles to coarsen the ITO particles. An ITO powder suitable for a coating material for a transparent electroconductive material, being produced by a first step of dissolving salt containing indium and salt containing tin into an organic solvent, then adding to this organic solvent, an organic solvent containing a basic precipitant, to thereby manufacture a mixture of a precursor containing indium and tin, and the organic solvent; and a second step of applying heat treatment to the mixture of the precursor containing indium and tin, and the organic solvent in a pressurizing vessel at 200° C. or more and 300° C. or less, to generate ITO particles.

4 Claims, 5 Drawing Sheets

METHOD OF PRODUCING ITO PARTICLES

TECHNICAL FIELD

The present invention relates to a producing method of an indium-tin-oxide containing tin (described as ITO hereafter), and ITO powder, a coating material for a transparent electroconductive material containing the ITO powder, and a transparent electroconductive film formed by using the coating material.

DESCRIPTION OF RELATED ART

An electroconductive film containing ITO exhibits a high light-shielding performance to a visible light and electroconductivity, and therefore is used as a transparent electrode film such as each kind of display device and a solar cell. As a film formation method of this transparent electroconductive film, a physical vapor deposition method such as a sputtering method using an ITO target, and a coating method for coating a dispersion liquid of ITO particles and an organic compound of tin and indium, are known.

Generally, an ITO film formation method by physical vapor deposition such as a sputtering method using an ITO target is widely used, from a viewpoint of low electric resistance, high visible ray transmissivity, and chemical stability. However, in the present sputtering film formation method, only a slight amount of the ITO target is actually used as a transparent electrode, due to adhesion loss of ITO to an inside of a sputtering apparatus during film formation and etching loss during formation of wiring, or the like. A major part of the used ITO target is regenerated by recycling. However, in this case, regeneration lead time exists, and therefore as an actual problem, it is necessary to secure a larger amount of indium raw material than an amount used as wiring. Further, in the sputtering film formation method, renewal of a film formation apparatus is required, so as to enlarge the size of the ITO target and a vacuum chamber, etc., in accordance with a rapid demand expansion of a large-sized thin television.

Meanwhile, although the ITO film obtained by a coating method has a slightly low electroconductivity compared with the ITO film formed by a physical method such as a sputtering method, it has an advantage that it can be formed to have a large area or a complicated shape without using an expensive apparatus such as a vacuum apparatus, thus reducing a film formation cost. Then, a technique of forming and wiring of a transparent electroconductive film has been focused recently, wherein the transparent electroconductive film is formed and wired by turning the ITO particles into coating materials and directly coating a surface of a substrate with the ITO particles and heating the ITO particles in the atmosphere. If this method is used, use efficiency of the indium raw material can be increased, and also an electrode with a large area can be manufactured by using a printing technique, and therefore this is a technique that has drawing attention in recent years.

Meanwhile, as a producing method of the ITO particles that constitute the ITO powder used for turning the ITO film, a method of adding and neutralizing/precipitating alkali such as ammonia and caustic soda in an aqueous solution containing indium ion such as indium chloride aqueous solution and tin ion such as tin chloride aqueous solution to thereby generate indium hydroxide containing tin, and applying heat treatment (sintering) thereto at a high temperature of 500° C. or more in the atmosphere or reduced atmosphere to thereby cause crystallization.

Further, patent document 1 discloses a method of generating a cubic or rectangular parallelepiped indium hydroxide particles with extremely good crystallinity by heating the indium hydroxide at 110° C., and further adding tin chloride and a basic precipitant to thereby obtain indium hydroxide, tin hydroxide precipitates, and further increasing crystallinity by hydrothermally treating the indium hydroxide and the tin hydroxide precipitates in a pressurized vessel, and thereafter applying heat treatment thereto at a high temperature of 500° C. or more, to thereby obtain the ITO particles with good crystallinity.

Meanwhile, a method of using an organic material is also disclosed as a method of obtaining the ITO particles. Patent document 2 discloses a method of dissolving indium salt and tin salt into an organic solvent, and thereafter adding alkali aqueous solution thereto to thereby generate indium hydroxide and tin hydroxide, then drying a mixture of the obtained indium hydroxide and tin hydroxide, and thereafter applying heat treatment thereto. Patent document 3 discloses a method of obtaining the ITO particles by applying heat treatment to tin-containing indium hydroxide in an organic solvent at a temperature of 240° or more.

PRIOR ART DOCUMENTS

Patent Documents

Patent document 1:
Japanese Patent Laid Open Publication No. 2008-222467 (Japanese Patent Application No. 2007-060558)
Patent document 2:
Japanese Patent Laid Open Publication No. 03-54114
Patent document 3:
Japanese Patent Laid Open Publication No. 2007-269617

SUMMARY OF THE INVENTION

Problem to be Solved by the Invention

As described above, the preset invention provides a promising technique of turning ITO particles into coating materials, and directly coating a surface of a substrate with the coating material, and thereafter forming and wiring an ITO film by a process of applying a heat treatment thereto in the atmosphere at a relatively low temperature.

However, in the patent document 1, tin-containing indium hydroxide with good crystallinity is obtained by applying heat treatment at 100° C. or less to a product produced by adding basic salt to inorganic salt containing indium and tin in an aqueous solution and applying hydrothermal treatment thereto at 200° C. or more, and further the ITO particles with good crystallinity are obtained by drying the tin-containing indium hydroxide and thereafter applying heat treatment to this dried material. However, in a hydrothermal treatment under pressure in an autoclave, although indium hydroxide and indium oxyhydroxide can be generated, indium oxide is hardly generated. Accordingly, in order to obtain the ITO particles, it is necessary to dry a product after hydrothermal treatment, and thereafter apply heat treatment to this product.

Further, in the patent document 2, heat treatment is applied, in a state of reducing an aggregation of primary particles, by mixing the indium hydroxide and the tin hydroxide in the organic solvent. In this method as well, similarly to a conventional producing method of the ITO particles, it is indispensable to perform the step of applying heat treatment at 500° C. or more in the atmosphere. Therefore, a phenomenon that ITO particles are sintered and coarsened can not be avoided.

Further, when the ITO particles are turned into coating materials, which are obtained through the step of applying heat treatment in the air or in the atmosphere, it is extremely difficult to obtain the ITO coating material with good dispersability, even if the ITO particles are dispersed as they are Therefore, in order to obtain a good dispersabiltiy of the ITO particles, a pulverization/dispersion step of secondary particles of the ITO is necessary.

When the aforementioned pulverization/dispersion is not sufficient and the ITO film is formed by ITO coating materials containing coarse ITO particles, the dispersability of the ITO particles and transparency of a coating film are deteriorated, thus increasing turbidity of the coating film.

Meanwhile, when a beads mill is used in the aforementioned pulverization/dispersion step, there is a problem that productivity is reduced due to required pulverization time, and also electroconductivity characteristic of the obtained coating film is deteriorated by a mixture of impurities into the ITO coating materials due to contamination from a media such as beads.

Meanwhile, as a method of producing indium oxide particles in the organic solvent, patent document 3 discloses a method of producing indium oxide containing tin, by dispersing the product produced by adding the basic salt to the inorganic salt containing indium and tin and heating the organic solvent with the product dispersed therein at a temperature of 240° C. or more. By this method, although an ITO coating liquid with good dispersability can be produced, the organic solvent containing the product needs to be treated at a high temperature, and therefore the organic solvent having a high boiling point of at least 240° C. or more needs to be absolutely used. Here, as a film formation temperature for producing the ITO film from the ITO coating liquid, a heating temperature during film formation is desired to be 250° C. or less and further 200° C. or less, because a softening point of glass or a heat resistant temperature of other electronic member is in the vicinity of 300° C. Accordingly, when the organic solvent of 240° C. or more is used as a solvent of the ITO coating liquid, it is difficult to easily evaporate the organic solvent during film formation, and the solvent needs to be replaced with a solvent with a low boiling point. In addition, since a complete solvent replacement is extremely difficult, there is a problem that a film is inhibited from being formed at a low temperature, due to a residue of an organic material having a high boiling point.

Therefore, according to this producing method, in order to obtain a dispersion liquid with ITO particles dispersed in the organic solvent having a boiling point of less than 240° C., the replacement of the solvent is needed after synthesizing the ITO particles.

In view of the above-described problem, an object of the present invention is to provide ITO powder and a producing method of the same, capable of obtaining a transparent electromagnetic film with good crystallinity by a simple treating method even at a low heating temperature, without through a heating process in the atmosphere which disadvantageously causes sintering among the ITO particles to coarsen the ITO particles. Further object of the present invention is to provide ITO powder with no residue of the organic solvent even in a case of sintering at a low temperature and a producing method of the same, when a film is formed by using a coating material for an electroconductive material containing the ITO powder, without an essential requirement of using a solvent having a high boiling point as a solvent used in the producing step of the ITO powder.

Means for Solving the Problem

As a result of a study on solving the above-described problem, inventors of the present invention achieve a new structure that a precursor containing indium and tin is formed in an organic solvent, being an organic solvent with a low boiling point, and next by applying treatment to the precursor and the organic solvent under pressure, ITO particles are generated in a particle dispersion liquid comprising the organic solvent with a low boiling point.

Namely, in order to solve the above-described problem, a first structure of the present invention is a producing method of ITO particles, comprising:

a first step of dissolving salt containing indium and salt containing tin into an organic solvent, then adding to this organic solvent, an organic solvent containing a basic precipitant, to thereby manufacture a mixture of a precursor containing indium and tin, and the organic solvent; and a second step of applying heat treatment to the mixture of the precursor containing indium and tin, and the organic solvent in a pressurizing vessel at 200° C. or more and 300° C. or less, to thereby generate ITO particles.

A second structure of the present invention is the producing method of the ITO particles according to the first structure, wherein the organic solvent contains one or more OH groups per one molecule and having a boiling point of less than 240° C.

A third structure of the present invention is the producing method of the ITO particles according to the first structure, wherein the organic solvent contains one or more OH groups per one molecule and has a boiling point of less than 200° C.

A fourth structure of the present invention is the producing method of the ITO particles according to any one of the first to third structures, wherein in the second step, an amount of the precursor containing indium and tin and an amount of water contained in the mixture of the organic solvent are less than 15 mass %.

A fifth structure of the present invention is the producing method of the ITO particles according to any one of the first to fourth structures, wherein the organic solvent is a hydrophilic organic solvent.

A sixth structure of the present invention is the producing method of the ITO particles according to any one of the first to fifth structures, wherein the organic solvent is a solvent of one kind or more containing at least polyol.

A seventh structure of the present invention is the producing method of the ITO particles according to any one of the first to sixth structures, wherein the organic solvent is a solvent of one kind or more containing at least ethylene glycol.

An eighth structure is ITO powder wherein an average primary particle diameter obtained from a TEM photograph is 10 nm or more and 100 nm or less.

A ninth structure of the present invention is the ITO powder according to the eighth structure, wherein a value of "(an average primary particle diameter obtained from the TEM photograph)/(crystallite diameter calculated from (222) plane of indium oxide obtained from the XRD diffraction peak)" is 0.8 or more and 1.2 or less.

A tenth structure of the present invention is the ITO powder according to eighth or ninth structure, wherein there is no crystal boundary in particles.

An eleventh structure of the present invention is the ITO powder according to any one of the eighth to tenth structures, wherein each particle that constitutes the ITO powder has a cubic or rectangular parallelepiped shape.

A twelfth structure of the present invention is a coating material for a transparent electroconductive material, which contains the ITO particles produced by the producing method of the ITO particles according to any one of the first to seventh structures, or the ITO powder according to any one of the eighth to eleventh structures.

A thirteenth structure of the present invention is a transparent electroconductive film, which is produced by using the coating material for the transparent electroconductive material according to the twelfth structure.

Advantage of the Invention

According to the present invention, ITO particles can be produced without through a heating process in the atmosphere which disadvantageously causes sintering among the ITO particles to coarsen the ITO particles. Further, according to the present invention, ITO powder can be produced, which is suitable for a coating material for a transparent electroconductive material without using a solvent with a high boiling point as a solvent used in a manufacturing process of the ITO powder.

Figure 1:
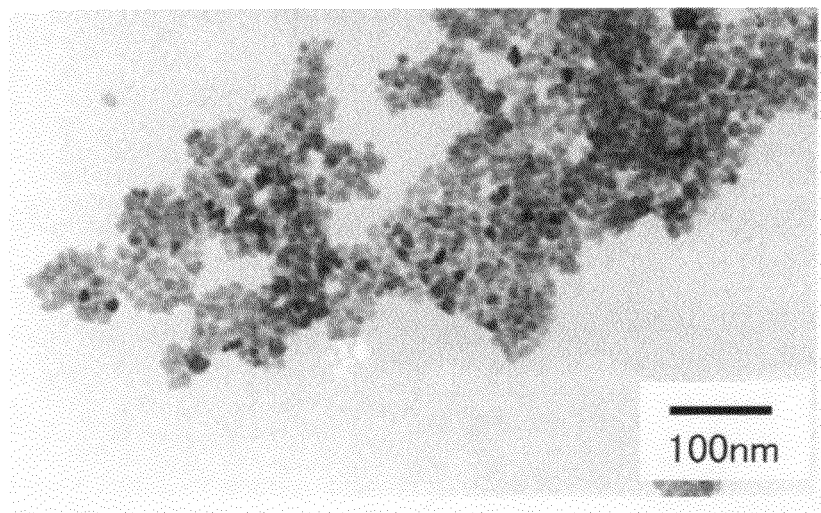
FIG. 1 is a TEM image of ITO powder according to example 1.

DESCRIPTION OF PREFERRED
EMBODIMENTS OF THE INVENTION

ITO particles that constitute the ITO POWDER suitable for a coating material for a transparent electroconductive material according to the present invention will be described.

An average primary particle diameter measured from a TEM image of the ITO particles that constitute the ITO powder according to the present invention is 10 nm or more and 100 nm or less. This is because by setting the average primary particle diameter to 10 nm or more, increase of the number of contacts of particles per unit area is suppressed during film coating, thus also suppressing an increase of a contact resistance. Meanwhile, this is because by setting the average primary particle diameter to 100 nm or less, a sintering temperature of the particles is decreased, thus allowing the particles to be sintered at a low temperature if the average primary particle diameter is 100 nm or less, and allowing a homogeneous film to be produced.

Further, if each ITO particle that constitutes the ITO powder has a cubic or rectangular parallelepiped shape, crystallinity of the ITO particle is higher than the crystallinity of a spherical particle.

Then, it is possible to form an ITO film with the coating film made more closely minute by regularly arranging the cubic or rectangular parallelepiped ITO particles, rather than by arranging spherical ITO particles, and a film with low electric resistance value can be obtained.

Further, in the ITO particles that constitute the ITO powder suitable for the coating material for the transparent electroconductive material according to the present invention, a value of "(average primary particle diameter obtained from the TEM photograph)/(crystallite diameter calculated from (222) plane of indium oxide obtained from (XRD diffraction peak)" which is obtained by dividing an ITO particle (primary particle) diameter observed from the TEM image by a crystallite diameter calculated from (222) plane of indium oxide obtained from an XRD spectrum, is closed to 1.0. This is because the value close to 1.0 is considered to show that each ITO particle itself is a particle closed to a single crystal, and specifically show that the value is 0.8 or more, 1.2 or less, and further preferably 0.9 or more, and 1.1 or less. Also this is because as a result, the particles that constitute the ITO powder according to the present invention are particles with extremely good crystallinity wherein there is no crystal boundary in one particle, and a film with high electroconductivity and low resistance can be formed.

Next, the manufacturing method of the ITO powder according to the present invention will be described.

First, a solution containing indium and tin is prepared. The solution containing the indium and tin is an indium salt solution with indium concentration set to 0.1 to 4.0 mol/L, preferably 0.2 to 2.0 mol/L. In this solution, an addition amount of tin salt is set to 5 to 20 mol % with respect to indium.

As a solvent of a solution with indium salt and tin salt dissolved therein, an organic solvent having at least one or more OH groups per one molecule is preferable. Specifically, alcohols and particularly polyhydric alcohols are preferable, and further preferably ethylene glycol and diethylene glycol can be given. However, the organic solvent is not limited thereto, and polyhydric alcohols or its derivative with a boiling point of its organic solvent being 100° C. to 300° C. or less, and further preferably 250° C. or less, may be used, or ionic liquid may also be used.

It appears that this is because owing to hydrophilic indium salt and tin salt, being starting raw materials, the organic solvent has at least one or more OH groups per one molecule, or in a case of ionic one, it is easy to homogeneously dissolve the raw material salt, and homogeneous reactivity is improved during neutralization and heat treatment. Of course, not only one kind of the organic solvents but two kinds of them may be mixed and used. Further preferably, a hydrophilic water-soluble solvent capable of dissolving water of 50 volume % or more is used.

As a film forming temperature to be set for the coating liquid of ITO to ITO film, a heating temperature during film formation is desired to be 250° C. or less, and further preferably 200° C. or less, because a softening point of glass and a heat resisting temperature of other electronic component are in the vicinity of 300° C. The heating temperature during film formation is desired to be 250° C. or less and further preferably 200° C. or less. The boiling point of the used organic solvent is preferably less than 240° C., because the organic solvent is easily vaporized during film formation, and is therefore further preferably less than 200° C. However, if the boiling point of the organic solvent is excessively low, pressure during reaction and heating is excessively high, thus requiring a high pressure vessel based on the pressure and increasing a facility cost. Accordingly, from this viewpoint, the boiling point of the organic solvent is preferably 100° C. or more.

As described above, the organic solvent used for generating the ITO particles of this embodiment has preferably one or more OH groups per one molecule. By the organic solvent having one or more OH groups per one molecule, an effect different from the aforementioned effect can be exhibited. This is an effect of missing oxygen by robbing and reducing of O (oxygen) from tin-containing indium oxide by the OH group that exists in the organic solvent. Owing to the generated missing oxygen, carrier is generated in the generated ITO particles, and therefore electroconductivity is improved.

Here, from a viewpoint of a compound having many OH groups, polyol having two or more OH groups per one molecule is preferable as the organic solvent.

The indium salt dissolved into the solution can be obtained by dissolving a solution into the organic solvent, the solution being obtained by dissolving anhydride crystal salt of indium of at least one kind selected from a group consisting of $In_2(C_2O_4)_3$, $InCl_3$, $In(NO_3)_3$, and $In_2(SO_4)_3$, or crystal salt of hydrate such as $In(NO_3)_3 \cdot 3H_2O$, $InCl_3 \cdot 4H_2O$, $In_2(SO_4)_3 \cdot 9H_2O$, or indium metal into $H_2C_2O_4$, $HNO_3$, $HCl$, $H_2SO_4$, etc. However, from a viewpoint of reducing contained water in the organic solvent, the anhydride crystal salt is most preferably used.

The tin salt dissolved into the solution can be obtained by dissolving a solution into the organic solvent, the solution being obtained by dissolving anhydride crystal salt of at least one kind selected from a group consisting of $Sn_2(C_2O_4)_3$, $SnCl_2$, $SnCl_4$, $Sn(NO_3)_2$, and $SnSO_4$, or crystal salt of hydrate such as $Sn(NO_3)_3 \cdot 3H_2O$, $SnCl_3 \cdot 2H_2O$, $SnCl_4 \cdot 5H_2O$, $5H(SO_4)_2 \cdot 2H_2O$, or tin metal into $H_2C_2O_4$, $HNO_3$, $HCl$, $H_2SO_4$, etc. Further, organic tin such as tetramethyltin, tetrabutyltin may be used by being dissolved into the organic solvent.

From a viewpoint of reducing the contained water in the organic solvent, anhydride crystal salt or organic tin is preferably used as the used tin salt. However, the organic tin should be handled with care, and therefore the anhydride tin crystal salt is preferably used.

Indium concentration in the solution containing indium and tin is adjusted to be 0.1 to 4.0 mol/L, and preferably 0.2 to 2.0 mol/L before neutralization reaction. This is because indium concentration of 0.1 mol/L or more is preferable from a viewpoint of productivity. Also, indium concentration of 4.0 mol/L or less allows the indium salt to be dissolved into the organic solvent without being left and the indium salt exists homogeneously in the organic solvent in a solution during heating treatment as will be described later, thus making it easy to produce a particle having a uniform particle diameter.

Next, a solution containing the basic precipitant will be described.

Basic salt dissolved into the solution can be obtained by dissolving at least one kind of basic salt selected from a group consisting of NaOH, KOH, $NH_4OH$, $NH_3$, $NH_4HCO_3$, and $(NH_4)_2CO_3$ into the aforementioned organic solvent. Note that among these basic salts, NaOH, A liquid temperature of the solution containing indium and tin is maintained in a range of 5° C. to 95° C., and preferably 10° C. to 50° C. Then, the solution containing the basic salt is added into the solution kept warm with an addition time of within 24 hours and preferably within a range of 1 minute to 120 minutes, to thereby generate a precipitation solution containing indium hydroxide-tin hydroxide precipitant (described as "tin-containing indium hydroxide" hereafter in some cases). The basic salt is added up to 0.5 to 100 equivalent and preferably 1.0 to 10 equivalent of the indium salt, to thereby generate the precipitation solution of the indium hydroxide in the organic solvent. As an addition amount of the basic salt is increased, rapid pH fluctuation occurs during precipitation, to thereby generate fine particles. Namely, 0.5 equivalent or more of the addition amount of the basic salt is preferable because an unprecipitation amount is reduced. Meanwhile, even if 10 equivalent or more of the basic salt is added, the pH fluctuation during precipitation is not different so much from the case of 10 equivalent, and therefore 10 equivalent or less of the addition amount of the basic salt is sufficient.

Next, in order to obtain the ITO particles from the generated tin-containing indium hydroxide particles, heat treatment (treatment in an Autoclave) is applied to the obtained tin-containing indium hydroxide precipitation solution in an air-tightly closed vessel. At this time, preferably, solid-liquid separation is performed to the tin-containing indium hydroxide particles from the precipitation solution, so that the processing is shifted to the heat treatment (treatment in the Autoclave) without drying the particles. This is because by shifting the heat treatment process without drying the tin-containing indium hydroxide particles, being precursors, generation of the agglomeration of the precursors in this stage can be avoided. As a result, preferably an increase of the agglomeration of the ITO particles can be avoided.

Further, preferably the heat treatment temperature is set in a range of 200° C. to 300° C., and the treatment time is set in a range of 30 minutes to 200 hours. When the heat treatment temperature is set to 200° C. or more and is preferably set to 220° C. or more, longtime heating can be avoided. However, pressure in the air-tightly closed vessel is increased under high temperature condition. Therefore, when the heating temperature is 300° C. or less, the pressure during reaction is not excessively high, thus preferably requiring no special apparatus.

A water amount contained in the tin-containing indium hydroxide precipitation solution which is subjected to heat treatment in the air-tightly closed vessel, is set to 15 mass % or less. When the water amount is 15 mass % or less, the tin-containing indium hydroxide with high purity can be obtained. For the same reason, the water amount is further preferably set to 5 mass % or less.

The solid-liquid separation and washing are performed after heat treatment, to thereby obtain slurry of the ITO powder. The slurry of the ITO powder may be sent to the producing step of the coating material for the transparent electroconductive film, being the next step, or may be sent to the producing step of the coating material for the transparent electroconductive film, being the next step, after drying the particles once so as to be formed into the ITO powder. In any case, it is possible to expect effects such as a simple operation because a solvent with a high boiling point is not contained in the used organic solvent, and in addition, a film showing excellent electroconductivity can be formed at a heating temperature of 250° C. or less even in the producing step of the coating material for the transparent electroconductive film, being the next step, and in the step thereafter.

For example, a mantle heater, a ribbon heater, and an oil bath, etc., can be given as a heating apparatus used in this embodiment. Various heating apparatus can be used, provided that heating up to 300° C. is possible. Further, a reactor used in this embodiment is requested to have a function of keeping an air-tight state even under a pressure of a vapor pressure of 300° C. of the used solvent.

The ITO particles according to this embodiment thus obtained are the ITO particles that constitute the ITO powder suitable for the aforementioned coating material for the transparent electroconductive material according to the present invention.

It is found that all ITO particles of this embodiment are blue-based particles and the ITO particles having missing oxygen are generated. The ITO particles having the missing oxygen have improved electroconductivity because the carrier is generated in the ITO particles. Although the ITO particles not having the missing oxygen are generally white or yellow particles, they are turned into green or blue-based particles by having missing oxygen.

Next, explanation will be given for the production of the coating material for the transparent electroconductive film using the ITO powder or the slurry of the ITO powder according to this embodiment.

The coating material for the transparent electroconductive film according to the present invent ion can be produced by dispersing the ITO powder or the slurry of the ITO powder of the present invention into the solvent. At this time, the concentration of the ITO powder in this coating material for the transparent electroconductive film may be adjusted in a range of 5 to 25 mass %.

Further, as a medium in a liquid state in which the ITO powder or the slurry of the ITO powder according to this embodiment is dispersed, not only the aforementioned organic solvent used for reaction, but also organic solvents such as alcohol, ketone, ether, ester, toluene, and cyclohexane may be used, or pure water may also be used. Further, a surface-active agent or a dispersant such as a coupling agent may also be used together.

Various base materials can be coated with the coating material for the transparent electroconductive films of the present invention such as substrates including ceramic and glass, etc., and an organic film.

Further, generation of unevenness is not observed during coating of the coating material for the transparent coating film.

Next, explanation will be given for an example of the film formation method of the transparent electroconductive film using the coating material for the transparent electroconductive film according to the present invention.

For example, when a film is formed on a glass substrate, the glass substrate is rotated by a spin coater. The coating material for the transparent electroconductive film of the present invention is dripped thereto to coat the glass substrate. After coating, the glass substrate is taken out and dried, and then is rotated again by the spin coater, to thereby drip an overcoat material. The obtained glass substrate after overcoat is dried and thereafter the temperature is increased up to, for example, 250° C. in the atmosphere, and then the glass substrate is held for 20 minutes and is naturally cooled, to thereby obtain the glass substrate with transparent electroconductive film formed thereon. The obtained glass substrate with transparent electroconductive film formed thereon exhibits excellent electroconductivity, although the heating temperature is about 250° C.

EXAMPLES

Explanation will be given for the ITO particles that constitute the ITO powder suitable for the coating material for the transparent electroconductive material, and the producing method of the same, with reference to examples.

Example 1

As a solution containing indium and tin, indium tri chloride tetrahydrate: 1.72 g and tin tetrachloride pentahydrate: 0.22 g were weighed, so that indium was set to 0.25 mol/L and tin was set to 0.025 mol/L in ethylene glycol 25 mL. Ethylene glycol: 25 mL was added little by little while stirring both salts, to thereby adjust the solution containing indium and tin.

Further, as a solution of 3 equivalent of indium, NaOH: 2.25 g was weighed, so that NaOH was set to 2.25 mol/L in the ethylene glycol: 25 mL. The ethylene glycol: 25 mL was added little by little while dissolving the NaOH, to thereby adjust a basic solution.

Ethylene glycol solution: 10 mL of sodium hydroxide was mixed and reacted in ethylene glycol solution: 10 mL of tin chloride and indium chloride while setting a liquid temperature not exceeding 30° C., to thereby obtain a suspending solution: 20 mL of ethylene glycol-tin containing indium hydroxide.

This suspending solution was set in an Auto clave and was heated at 250° C. for 12 hours. A precipitate was separately collected by using a centrifugal separator from a precipitation solution after heating. Then, the collected precipitate was dispersed by ethanol and thereafter the precipitate was separately collected again by using the centrifugal separator, to thereby obtain ITO powder according to example 1.

When shape observation was performed to the ITO powder according to the example 1 by using TEM (Transmission Electron Microscope), it was found that a generated particle had a spherical, cubic or rectangular parallelepiped shape.

An average particle diameter of the ITO particle (primary particle) that constitutes the ITO powder was computed by measuring a size (corresponding to a long side when the particle on the photograph is close to a square, and a diameter when it is close to a circular shape) of each particle of 100 ITO particles (primary particles) not overlapped on one another in the TEM photograph and calculating its average value. The TEM image (174,000 magnifications) of the ITO particles is shown in FIG. 1. Note that regarding the size of the circular particle, a maximum length of the particle on the TEM photograph was partially measured, and its measured value was defined as a diameter (particle diameter).

Each one of the generated ITO particles is a spherical, cubic or rectangular parallelepiped particle with a size (average particle diameter) of 14.4 nm.

Figure 8:
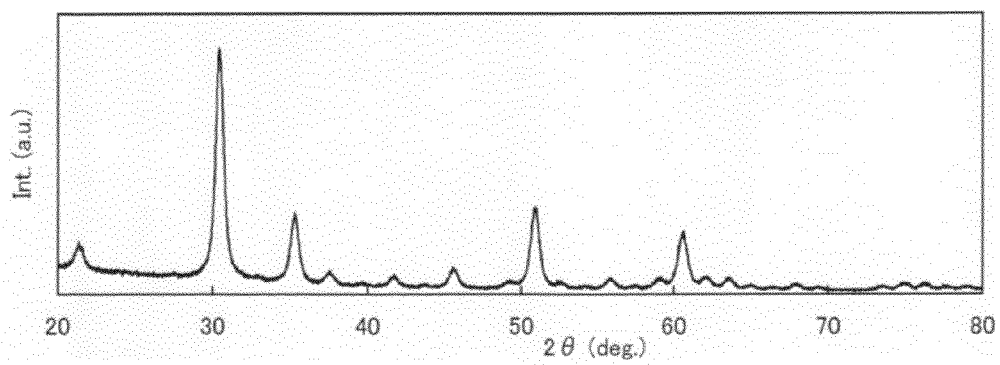
FIG. 8 shows a pattern of an XRD spectrum of the ITO powder according to the example 1.

Results of measuring XRD spectrum of the ITO powder is shown in FIG. 8. It was found that the obtained diffraction pattern coincides with a diffraction pattern of indium oxide and was composed of a single composition of the indium oxide having a cubic crystal system.

Further, a crystallite diameter of a sample of the example 1 was obtained by calculating intensity Int. (222) of a diffraction peak and a half-width B of a (222) diffraction peak wherein a peak appears at a 2θ angle of 29.0° to 31.0° (CuKα 1 light source), and by using Scherrer's formula $Dx=0.94\lambda/B\cos\theta$ (wherein Dx is a crystallite size, $\lambda$ is a wavelength (CuKα 1 light source) of X-ray used for measurement, B is a half width of the diffraction peak, and θ is a Bragg angle of the diffraction peak), then 14.5 nm was obtained. A value of "(average primary particle diameter obtained from the TEM photograph)/(crystallite diameter calculated from (222) plane of indium oxide)" was 0.99.

Example 2

In the same way as the example 1, ethylene glycol aqueous solution: 10 mL of sodium hydroxide: 2.25 mol/L was mixed and reacted in ethylene glycol solution: 10 mL of indium tri chloride tetrahydrate: 0.25 mol/L and tin tetrachloride pentahydrate: 0.025 mol/L, to thereby obtain a suspending solution of tin-containing indium hydroxide-ethylene glycol suspending solution: 20 mL. This suspending solution was set in an Auto clave and was heated at 250° C. for 24 hours. A precipitate was separately collected by using a centrifugal separator from a precipitation solution after heating. Then, the collected precipitate was dispersed by ethanol and thereafter the precipitate was separately collected again by using the centrifugal separator, to thereby obtain ITO powder according to example 2.

Figure 2:
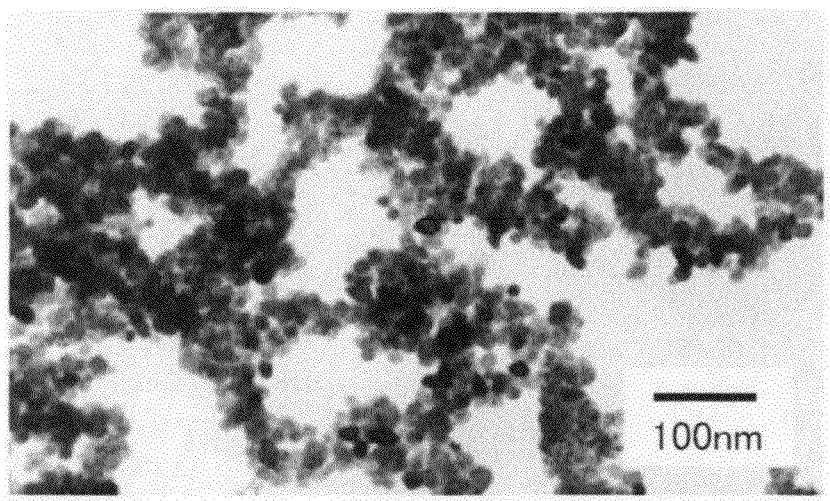
FIG. 2 is a TEM image of ITO powder according to example 2.

In the same way as the example 1, the generated ITO particle (primary particle) had a spherical, cubic or rectangular parallelepiped shape, with a size (average particle diameter) of 17.2 nm. Further, when the XRD spectrum was measured, it was found that the ITO particles were composed of a single composition of indium oxide, each particle having the crystallite diameter of 17.3 nm. The TEM image (174,000 magnifications) of the ITO particles is shown in FIG. 2.

A value of "(Average primary particle diameter obtained from the TEM photograph)/(crystallite diameter calculated form (222) plane of indium oxide)" was 0.99.

Example 3

In the same way as the example 1, ethylene glycol aqueous solution: 10 mL of sodium hydroxide: 2.25 mol/L was mixed and reacted in ethylene glycol solution: 10 mL of indium tri chloride tetrahydrate: 0.25 mol/L and tin tetrachloride pentahydrate: 0.025 mol/L, to thereby obtain tin-containing indium hydroxide-ethylene glycol suspending solution: 20 mL. This suspending solution was set in an Auto clave and was heated at 250° C. for 96 hours. A precipitate was separately collected by using the centrifugal separator from the precipitation solution after heating. Then, the collected precipitate was dispersed by ethanol and thereafter the precipitate was separately collected again by using the centrifugal separator, to thereby obtain ITO powder according to example 3.

Figure 3:
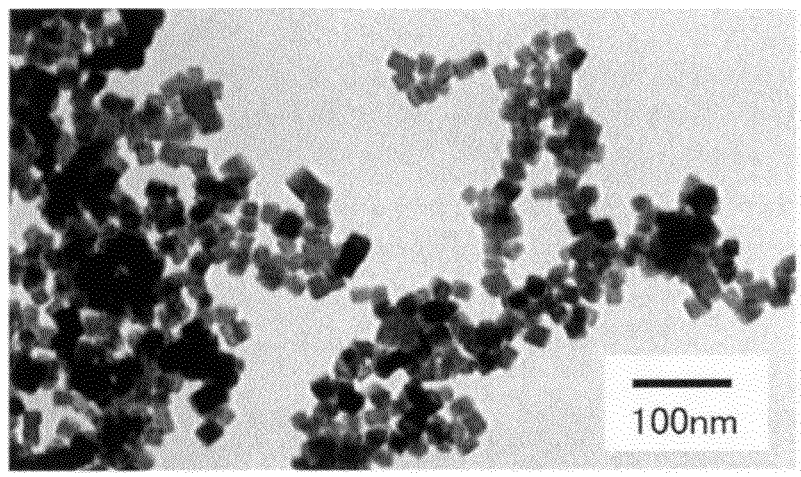
FIG. 3 is a TEM image of ITO powder according to example 3.
Figure 4:
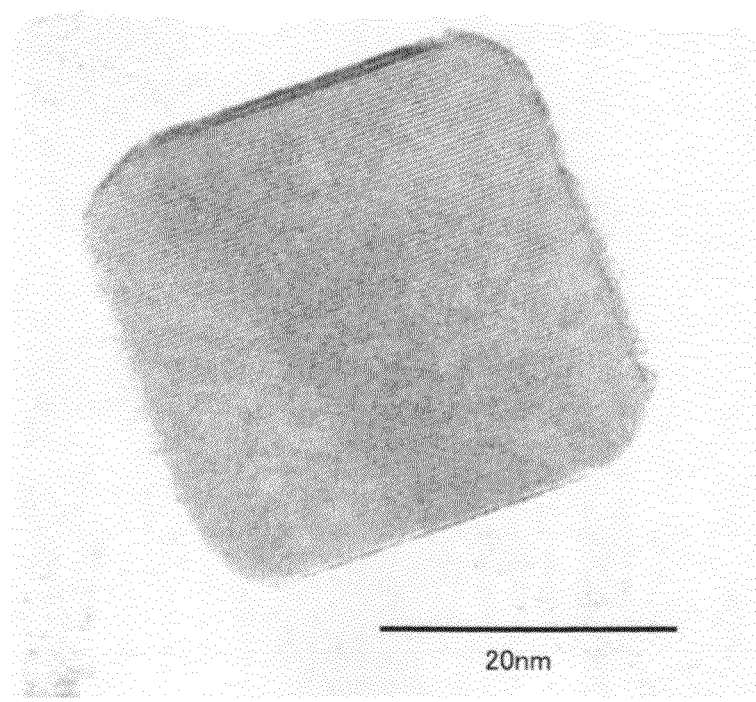
FIG. 4 is a high magnification image of the ITO powder according to the example 3.

In the same way as the example 1, the ITO particle (primary particle) of the example 3 had a spherical, cubic or rectangular parallelepiped shape, with a size (average particle diameter) of 23.0 nm. Further, when the XRD spectrum was measured, it was found that the ITO particles were composed of a single composition of indium oxide with the crystallite diameter being 25.3 nm. The TEM image (174,000 magnifications) of the ITO particles is shown in FIG. 3. In addition, further expanded TEM photograph (300,000 magnifications) of the ITO particles of the example 3 is shown in FIG. 4. Regular moire fringes are observed in the particles, and there is no grain boundary in association with dislocation. Therefore, it was found that the particles were composed of a single crystal.

A value of "(average primary particle diameter obtained from the TEM photograph)/(crystallite diameter calculated from (222) plane of indium oxide)" was 0.91.

Comparative Example 1

According to comparative example 1, the solvent of the example 1 is substituted with water from ethylene glycol.

As a solution containing indium and tin, indium tri chloride tetrahydrate: 1.72 g and tin tetrachloride pentahydrate: 0.22 g were weighed, so that indium was set to 0.25 mol/L and tin was set to 0.025 mol/L. Pure water: 25 mL was added little by little while stirring both salts, to thereby adjust the aqueous solution containing indium and tin.

Further, as a basic solution of 3.0 equivalent of indium, NaOH: 2.25 g was weighed, so that NaOH was set to 2.25 mol/L. The pure water: 25 mL was added little by little while dissolving the NaOH, to thereby adjust the basic solution.

Sodium hydroxide aqueous solution: 10 mL was mixed and reacted in aqueous solution: 10 mL of tin chloride and indium chloride while setting the liquid temperature not exceeding 30° C., to thereby obtain a suspending solution: 20 mL of tin-containing indium hydroxide.

This suspending solution was set in the Auto clave and was heated at 250° C. for 12 hours. A precipitate was separately collected by using the centrifugal separator from the precipitation solution after heating. Then, the collected precipitate was dispersed by ethanol and thereafter the precipitate was separately collected again by using the centrifugal separator, to thereby obtain ITO powder according to the comparative example 1.

Figure 7:
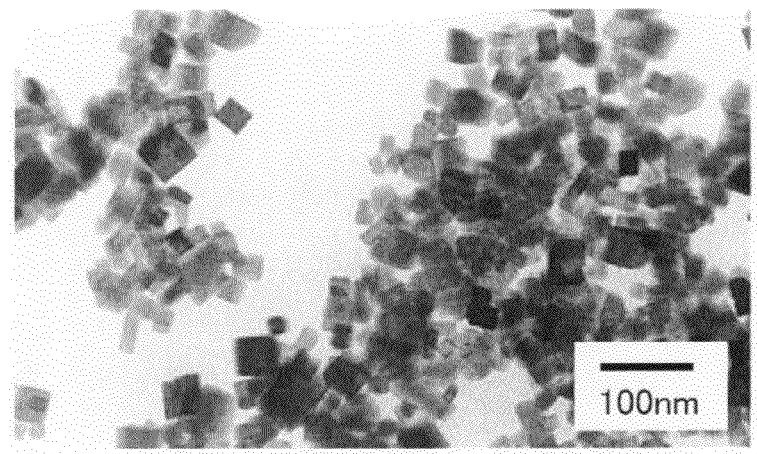
FIG. 7 is a TEM image of ITO powder according to comparative example 1.

In the same way as the example 1, the particles of the comparative example 1 (primary particles) were cubic or rectangular parallelepiped particles, each having a size (average particle diameter) of 40 nm. However, when the XRD spectrum was measured, it was found that the particles were composed of not a single composition of indium oxide but indium oxyhydroxide. The TEM image of the ITO particles (174,000 magnifications) is shown in FIG. 7.

Comparative Example 2

In comparative example 2, the solvent of the example 1 is substituted with a mixed solvent of ethylene glycol and water. As a solution containing indium and tin, indium trichloride: tetrahydrate 1.72 g, tin tetrachloride pentahydrate: 0.22 g, and pure water: 5 mL were weighed, so that indium was set to 0.25 mol/L and tin was set to 0.025 mol/L. Then, a total solution was set to 25 mL by adding ethylene glycol little by little while stirring both salts and pure water, to thereby adjust the water-ethylene glycol solution containing indium and tin.

Further, NaOH: 2.25 g and pure water: 5 mL were weighed so that NaOH was set to 2.25 mol/L, as a basic solution of 3.0 equivalent of indium. Then, a total solution was set to 25 mL by adding ethylene glycol little by little to the NaOH and pure water, to thereby adjust the basic water-ethylene glycol solution.

Basic water-ethylene glycol solution: 10 mL was mixed and reacted in water-ethylene glycol solution: 10 mL containing indium and tin while setting a liquid temperature not exceeding 30° C., to thereby obtain a suspending solution of indium hydroxide containing tin-ethylene glycol solution: 20 mL.

This suspending solution was set in an Auto clave and was heated at 250° C. for 12 hours. A precipitate was separately collected by using the centrifugal separator from the precipitation solution after heating. Then, the collected precipitate was dispersed by ethanol and thereafter the precipitate was separately collected again by using the centrifugal separator, to thereby obtain powder according to comparative example 2.

In the same way as the example 1, the generated particles of the comparative example 2 (primary particles) were cubic or rectangular parallelepiped particles, each having a size (average particle diameter) of 23 nm. However, when the XRD spectrum was measured, it was found that the particles were composed of not a single composition of indium oxide but indium oxyhydroxide.

(Conclusion of Examples 1, 2, 3, and Comparative Examples 1, 2)

Regarding ITO powders of examples 1, 2, 3, and powders of comparative examples 1, 2, measurement results of a reaction condition, TEM particle diameter, product phase obtained from the XRD spectrum, and crystallite diameter are shown in table 1.

From the results of the table 1, it was found that the ITO particles were not generated if a solution containing 15 mass % or more of water was used as tin-containing indium hydroxide precipitation solution which was subjected to heat treatment in the air-tightly closed vessel. It can be considered that this is because if 15 mass % or more of water is contained in the tin-containing indium hydroxide precipitation solution which is subjected to heat treatment in the air-tightly closed vessel, change from the oxyhydroxide to oxide does not occur. In the examples 1 to 3 as well, hydrate is used as raw material salts of indium and tin, and therefore the solvent substantially contains water of about 2 mass %. However, oxide particles are generated after heat treatment. Therefore, if the water contained in the tin-containing indium hydroxide precipitation solution which is subjected to heat treatment in the air-tightly closed vessel, is less than 15 mass %, it can be considered that the oxide of indium and tin is generated.

Further, the particle size (average particle diameter) obtained from the TEM observation with extension of a heat treatment time and the crystallite diameter obtained from XRD are increased, and it can be considered that a particle growth occurs. In the example 3 in which the heat treatment was performed for 96 hours, the ITO particles each having a cubic or rectangular parallelepiped shape were generated, and it was found that the ITO particles with extremely excellent crystallinity were formed, with extension of the heat treatment time.

Example 4

In example 4, the solvent of the example 1 is substituted with diethylene glycol from ethylene glycol.

In the same way as the example 1, diethylene glycol solution: 25 mL of the indium tri chloride tetrahydrate: 0.25 mol/L and tin tetrachloride pentahydrate: 0.025 mol/L, and diethylene glycol solution 25 mL of sodium hydroxide 2.25 mol/L were prepared.

Both solutions, each being 10 mL, were respectively mixed and reacted, to thereby obtain diethylene glycol suspending solution: 20 mL of tin-containing indium hydroxide. Then, the precipitation solution was set in the Auto clave and was heated at 250° C. for 12 hours.

A precipitate was separately collected by using the centrifugal separator from the precipitation solution after heating. Then, the collected precipitate was dispersed by ethanol and thereafter the precipitate was separately collected again by using the centrifugal separator, to thereby obtain ITO powder according to the example 4.

Figure 5:
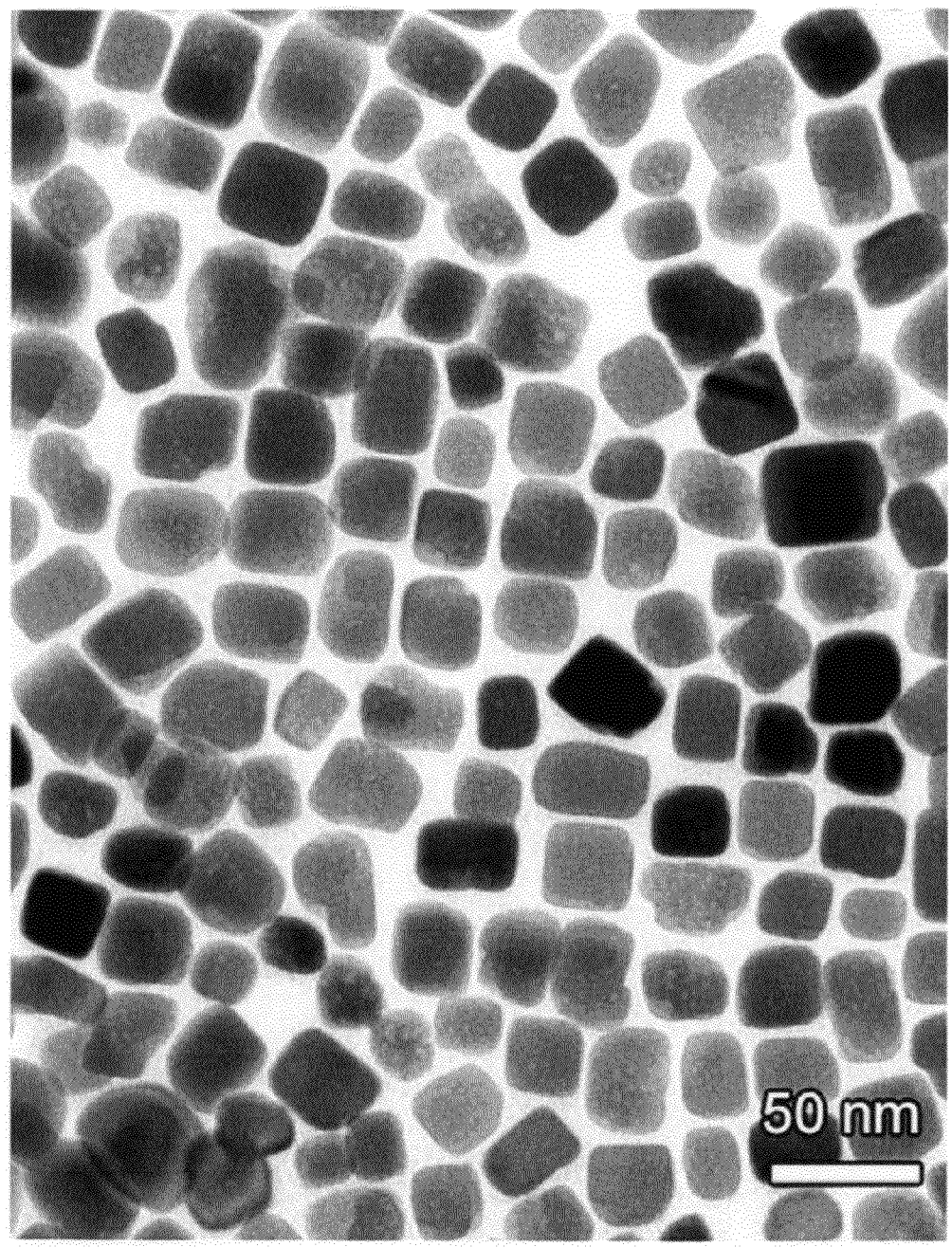
FIG. 5 is a TEM image of ITO powder according to example 4.

The ITO particles of the example 4 (primary particles) were cubic or rectangular parallelepiped particles, each having a size (average particle diameter) of 28.7 nm. The TEM image of the ITO particles is shown in FIG. 5. Further, when the XRD spectrum was measured, it was found that the particles were composed of a single composition of indium oxide with a crystallite diameter being 28.7 nm.

A value of "(average primary particle diameter obtained from the TEM photograph)/(crystallite diameter calculated from (222) plane of indium oxide obtained from XRD diffraction peak)" was 1.0.

Example 5

In example 5, the solvent of the example 1 is substituted with 1-butanol from ethylene glycol.

In the same way as the example 1,1-butanol solution: 25 mL of the indium tri chloride tetrahydrate: 0.25 mol/L and tin tetrachloride pentahydrate: 0.025 mol/L, and 1-butanol solution: 25 mL of sodium hydroxide 2.25 mol/L were prepared.

Both solutions, each being 10 mL, were respectively mixed and reacted, to thereby obtain 1-butanol suspending solution: 20 mL of tin-containing indium hydroxide. Then, the precipitation solution was set in the Auto clave and was heated at 250° C. for 12 hours. A precipitate was separately collected by using the centrifugal separator from the precipitation solution after heating. Then, the collected precipitate was dispersed by ethanol and thereafter the precipitate was separately collected again by using the centrifugal separator, to thereby obtain ITO powder according to the example 5.

The ITO particles of the example 5 were spherical shaped particles each having a size (average particle diameter) of 11.5 nm. Further, when the XRD spectrum was measured, it was found that the particles were composed of a single composition of indium oxide, each particle having the crystallite diameter of 10.0 nm.

A value of "(average primary particle diameter obtained from the TEM photograph)/(crystallite diameter calculated from (222) plane of indium oxide obtained from the XRD diffraction peak)" was 1.15.

Example 6

Example 6 shows an example of adjusting the ITO powder by changing the heat treatment temperature of the example 1.

The ITO powder of the example 6 was adjusted by the same method as the example 1, excluding a point that a temperature of a heating process was changed from 250° C. to 220° C.

The ITO particles (primary particles) of the example 6 were spherical shaped particles each having a size (average particle diameter) of 11.5 nm. Further, when the XRD spectrum was measured, it was found that the particles were composed of a single composition of indium oxide, each particle having the crystallite diameter of 13.8 nm.

A value of "(average primary particle diameter obtained from the TEM photograph)/(crystallite diameter calculated from (222) plane of indium oxide obtained from the XRD diffraction peak)" was 0.83.

Example 7

Example 7 shows an example of adjusting the ITO powder by substituting indium salt of the example 1 with indium nitrate.

The ITO powder of the example 7 was adjusted in the same method as the example 1, excluding a point that the indium salt was substituted with indium nitrate from indium chloride.

The ITO particles (primary particles) of the example 7 were spherical shaped particles each having a size (average particle diameter) of 14.4 nm. Further, when the XRD spectrum was measured, it was found that the particles were composed of a single composition of indium oxide, each particle having the crystallite diameter of 16.4 nm.

A value of "(average primary particle diameter obtained from the TEM photograph)/(crystallite diameter calculated from (222) plane of indium oxide obtained from the XRD diffraction peak)" was 0.88.

Example 8

Example 8 shows an example of adjusting the ITO powder by substituting the basic salt of the example 1 with ammonium carbonate.

The ITO powder of the example 8 was adjusted in the same method as the example 1, excluding a point that the basic salt was changed from sodium hydroxide: 2.25 mol/L to ammonium carbonate: 1.125 mol/L.

The ITO particles (primary particles) of the example 7 were spherical particles each having a size (average particle diameter) of 23 nm. Further, when the XRD spectrum was measured, it was found that the particles were composed of a single composition of indium oxide with each crystallite diameter being 22.8 nm.

A value of "(average primary particle diameter obtained from the TEM photograph)/(crystallite diameter calculated from (222) plane of indium oxide obtained from the XRD diffraction peak)" was 1.01.

(Conclusion from Examples 4 to 8)

Regarding the ITO powder of examples 4 to 8, measurement results of the reaction condition, TEM particle diameter, product phase obtained from the XRD spectrum, and crystallite diameter are shown in table 1.

From data of the table 1, it was found that the ITO particles suitable for the coating material for the transparent electroconductive material of the present invention were generated, even if the solvent was substituted with alcohols. From data of the example 6, it was found that the ITO particles suitable for the coating material for the transparent electroconductive material of the present invention were generated even if the temperature of the heating process was decreased to 220° C. Further, from the results of the example 4, it was confirmed that the ITO particles suitable for the coating material for the transparent electroconductive material of the present invention were generated, even if the diethylene glycol was used as the solvent.

Further, it was found that the ITO powder suitable for the coating material for the transparent electroconductive material of the present invention could be obtained with excellent crystallinity equivalent to that of the example 1, even if the indium salt was substituted with nitrate salt, and basic salt was substituted with ammonium carbonate.

TABLE 1

| | Reaction condition | | | | TEM particle diameter (nm) | Crystallite diameter (nm) |
|---|---|---|---|---|---|---|
| | Temp (° C.) | Time (h) | Solvent | Product | | |
| Example 1 | 250 | 12 | Ethylene glycol | $In_2O_3$ | 14.4 | 14.5 |
| Example 2 | 250 | 24 | Ethylene glycol | $In_2O_3$ | 17.2 | 17.3 |
| Example 3 | 250 | 96 | Ethylene glycol | $In_2O_3$ | 23.0 | 25.3 |
| Com. Ex. 1 | 250 | 12 | Water | InOOH | 40.0 | — |
| Com. Ex. 2 | 250 | 12 | Ethylene glycol + water | InOOH | 23.0 | — |
| Example 4 | 250 | 12 | Diethylene glycol | $In_2O_3$ | 28.7 | 28.7 |
| Example 5 | 250 | 12 | Butanol | $In_2O_3$ | 11.5 | 10.0 |
| Example 6 | 220 | 12 | Ethylene glycol | $In_2O_3$ | 11.5 | 13.8 |
| Example 7* | 250 | 12 | Ethylene glycol | $In_2O_3$ | 14.4 | 16.4 |
| Example 8** | 250 | 12 | Ethylene glycol | $In_2O_3$ | 23.0 | 22.8 |
| Example 9 | 250 | 96 | Ethylene glycol | $In_2O_3$ | 48.2 | 47.5 |

Com.: Comparative
Ex.: Example
Example 7*: indium salt is substituted with indium nitrate from indium chloride
Example 8**: basic salt is substituted with ammonium carbonate from sodium hydroxide Com.: Comparative
Ex.: Example
Example 7*: indium salt is substituted with indium nitrate from indium chloride
Example 8**: basic salt is substituted with ammonium carbonate from sodium hydroxide Example 9

As a solution containing indium and tin, indium tri chloride tetrahydrate and tin tetrachloride pentahydrate were weighed, so that indium was set to 0.5 mol/L and tin was set to 0.05 mol/L in ethylene glycol: 25 mL. Ethylene glycol: 25 mL was added little by little while stirring both salts, to thereby adjust the solution containing indium and tin.

Meanwhile, NaOH was weighed so that NaOH concentration in the ethylene glycol: 25 mL was set to 1.00 mol/L. Ethylene glycol: 25 mL was added to the weighed NaOH little by little, to thereby adjust a basic solution.

The basic solution: 10 mL was mixed and reacted in the solution: 10 mL containing the indium and tin while setting the liquid temperature not exceeding 30° C., to thereby obtain a suspending solution: 20 mL of ethylene glycol-tin containing indium hydroxide.

This suspending solution was set in the Auto clave and was heated at 250° C. for 96 hours. A precipitate was separately collected by using the centrifugal separator from the precipitation solution after heating. Then, the collected precipitate was dispersed by ethanol and thereafter the precipitate was separately collected again by using the centrifugal separator, to thereby obtain ITO powder according to example 9.

Figure 6:
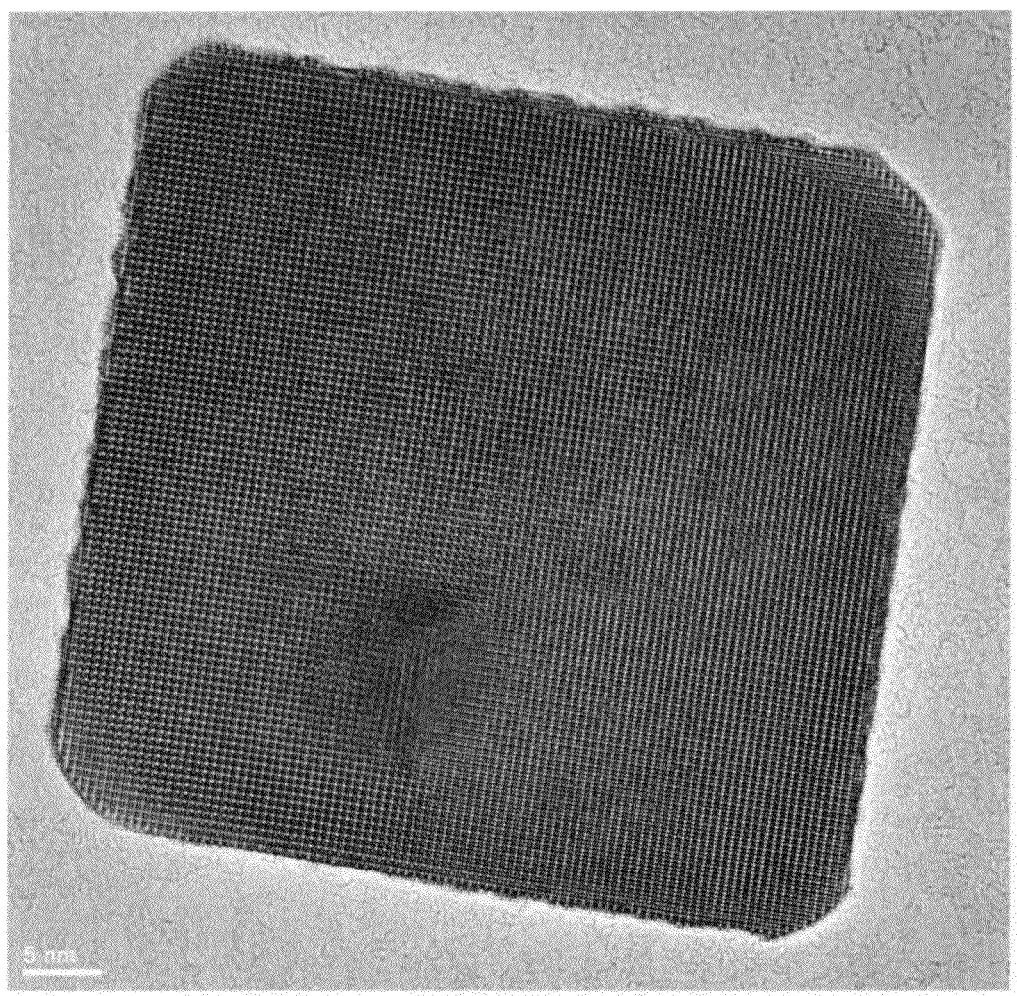
FIG. 6 is a TEM image of ITO powder according to example 9.

When the average particle diameter of the ITO particles (primary particles) of the ITO powder of the example 9 was measured in the same way as the example 1, it was found that each particle has the cubic or rectangular parallelepiped shape having a size (average particle diameter) of 48.2 nm. Further, when the XRD spectrum of the ITO particles was measured, it was found that the particles were composed of a single composition with the crystallite diameter being 47.5 nm. The TEM image of the ITO particles is shown in FIG. 6.

Further, a value of "(an average primary particle diameter obtained from the TEM photograph)/(crystallite diameter calculated from (222) plane of indium oxide obtained from the XRD diffraction peak)" was 1.01.

The invention claimed is:

1. A producing method of ITO particles, comprising:
   a first step of dissolving salt containing indium and salt containing tin into an organic solvent containing polyol, then adding to this organic solvent, an organic solvent containing a basic precipitant and polyol, to thereby manufacture a mixture of a precursor containing indium and tin, and the organic solvents; and
   a second step of applying heat treatment to the mixture of the precursor containing indium and tin, and the organic solvents in a pressurizing vessel at 200° C. or more and 300° C. or less, to thereby generate ITO particles, wherein in the second step, an amount of water contained in the mixture of the precursor containing indium and tin and the organic solvents is less than in a range from 2 mass % to 15 mass %.

2. The producing method of the ITO particles according to claim 1, wherein the organic solvent has a boiling point of less than 240° C.

3. The producing method of the ITO particles according to claim 1, wherein the organic solvent has a boiling point of less than 200° C.

4. The producing method of the ITO particles according to claim 1, wherein the organic solvent is ethylene glycol.

* * * * *